United States Patent Office 3,592,669
Patented July 13, 1971

3,592,669
WATER REPELLENT COMPOSITION FOR COATED OPTICAL GLASS SURFACES
Hayward R. Baker, Silver Spring, Md., and Robert N. Bolster, Fairfax County, Va., assignors to the United States of America as represented by the Secretary of the Navy
No Drawing. Filed Apr. 23, 1968, Ser. No. 723,616
Int. Cl. C09k 3/18
U.S. Cl. 106—2                                3 Claims

ABSTRACT OF THE DISCLOSURE

Compositions which are mixtures of a hydrocarbon wax in equal to minor proportion by weight with mixed isomers of long chain alkylamine salts of long chain alkyl or alkenylsuccinic acid long chain alkylmonoamides. The compositions are water repellent and may be used to provide a transparent water repellent film on optical glass surfaces which are coated with an antireflection coating such as magnesium fluoride.

---

The invention described herein may be manufactured and used by or for the Government of the United States of America for governmental purposes without the payment of any royalties thereon or therefor.

This invention relates to new compositions, more particularly to new water repellent compositions for coated optical glass surfaces.

BACKGROUND OF INVENTION

Optical glass surfaces exposed to rain or sea water cannot transmit images without distortion if the water wets the surface and forms an irregular layer thereon. If the surface is coated with a water repellent, the water layer will drain off or pull up into drops and allow the surface to transmit the light rays without distortion. Water repellents developed in the past, such as those for aircraft windshields, have been designed to bond to glass. If the glass surface has been coated with magnesium fluoride or other ionic antireflection coating, water repellents designed for glass will not be effective due to insufficient adhesion to the antireflection coating.

SUMMARY OF THE INVENTION

It is an object of the present invention to provide new compositions.

It is also an object to provide new water repellent compositions.

It is a further object to provide new compositions which are effective to provide a transparent water repellent coating on optical glass surfaces which have been coated with an ionic antireflection film such as of magnesium fluoride.

It is another object to provide a transparent water repellent coating on optical glass surfaces which have been coated with an ionic antireflection film.

The above and other objects are accomplished in the present invention which comprises new compositions and their use in providing transparent water repellent coatings on optical glass surfaces which are coated with an ionic antireflection film.

DESCRIPTION OF THE PREFERRED EMBODIMENTS

The new compositions comprise a hydrocarbon wax in which is incorporated mixed isomers of alkylamine salts of alkyl and alkenylsuccinic acid alkylmonoamides which are hereinafter more fully defined. The mixed isomers are hard waxy materials and have the formulas:

$$\begin{array}{cc} H_2C-CHR \\ | & | \\ R_1R_2NH.HOOC & CONR_2R_1 \end{array}$$

and $$\begin{array}{cc} H_2C-COR \\ | & | \\ R_1R_2NOC & COOH.HNR_2R_1 \end{array}$$

wherein R is an alkyl or alkenyl radical having a straight chain of from 12 to 22 carbon atoms; $R_1$ is an alkyl radical having a straight chain of from 18 to 22 carbon atoms and $R_2$ is hydrogen or an alkyl radical having a straight chain of from 18 to 22 carbon atoms. R may be, for example, dodecyl, tetradecyl, hexadecyl, heptadecyl, octadecyl; dodecenyl, tetradecenyl, hexadecenyl, octadecenyl, etc. $R_1$ and $R_2$ may be, for example, octadecyl, arachidyl, behenyl, etc. Among the mixed isomers are, for example, the isomeric octadecylamine salts of hexadecenylsuccinic acid octadecyl monoamides, the isomeric octadecylamine salts of octadecenylsuccinic acid octadecyl monoamides, the isomeric arachidylamine salts of dodecylsuccinic acid arachidyl monoamides, the isomeric arachidylamine salts of octadecylsuccinic acid arachidyl monoamides, the isomeric behenylamine salts of octadecenylsuccinic acid behenyl monoamides, etc.

The new compositions are preferably prepared by separately melting the hydrocarbon wax and the mixed isomers and mixing them together in the melted state. The hydrocarbon wax may be refined paraffin wax, (M.P. 124–127° F.) or microcrystalline wax, (M.P. 190° F.). The mixed isomers are melted by warming to about 130° F. and combined with the hydrocarbon wax in proportions to provide compositions which contain the mixed isomers in about equal to major amounts by weight on the hydrocarbon wax, for example, in a weight ratio of from about 1 to 5:1 respectively.

The compositions when applied to provide a water repellent film on glass optical surfaces which are coated with an antireflection coating, such as a magnesium fluoride film, will strongly adhere to the antireflection coating by an ionic bonding of the polar amine and amido groups thereto and present a transparent hydrophobic outer surface composed of the long chain alkyl and alkenyl groups which stand away from the antireflection coating to intercept incident rain or sea water.

The hydrocarbon wax in the compositions serves as the vehicle for the mixed isomers and to improve the integrity of the water repellent film on the antireflection coating through filling in of the holes left between the molecules of the ionically bonded mixed isomers.

Application of the compositions to provide a transparent water repellent film on optical glass surfaces coated with an antireflection coating is preferably done with the composition in the molten condition. However, they may also be applied for this purpose from solution in a volatile solvent such as a mixture of anhydrous ethanol with naphtha or heptane in a 1:2 ratio by volume. The composition in the melted state is dropped onto the coated optical glass surface which is heated to the melt temperature and, as the glass is cooling down, the applied composition is wiped over the surface to remove excess composition and leave an approximately monolayer film.

PREPARATION OF THE MIXED ISOMERS

The mixed isomers are prepared from an alkyl or alkenylsuccinic anhydride of the general formula:

$$\begin{array}{c} H_2C\text{-----}CHR \\ | \quad\quad\quad | \\ O=C \quad\quad C=O \\ \diagdown \diagup \\ O \end{array}$$

wherein R is an alkyl or alkenyl radical as defined above and a primary or secondary alkylamine of the general formula:

$$R_1R_2NH$$

wherein $R_1$ is an alkyl radical as defined above and $R_2$ is hydrogen or an alkyl radical as defined above.

The alkyl or alkenylsuccinic anhydride and the alkylamine are brought together in equivalent reacting proportions, i.e., in 1:2 mole ratio, in a suitable volatile solvent, for example, in ethanol or isopropanol, which may be dry or contain small amounts of water up to about 3% by weight, and the reactant mixture heated to a temperature of about 509 C., under stirring until it forms a solution. As soon as solution occurs, the reaction forming the mixed isomers takes place. The product mixed isomers are isolated from the reaction solution by evaporation of the solvent and, if present, of the water also. To insure removal of all the solvent and of water, if present, the isolated product mixed isomers are heated to about 110° C. for a short period of time, about 4–5 minutes. When a mixture of the alkylamines is used for preparation of the mixed isomers, a random occurrence of the alkyl radicals in the alkylamine salt and alkylamido portions of the molecule of the mixed isomers takes place.

The preparation of the mixed isomers is illustrated by the following specific example. While a mixture of the alkylamines was used, the preparation is the same for making mixed isomers using the individual alkylamines as defined above.

EXAMPLE

To 100 ml. of isopropanol was added 2½ grams of water, 4.14 grams of octadecenylsuccinic anhydride and 8 grams of commercial mixed amines (Kemamine P–190) composed of about 90% by weight of mixed arachidyl and behenyl amines and about 10% by weight of stearylamine. The weight ratio of the arachidyl to the behenyl amine was about 40% to 60%, respectively. This mixture was warmed to 50° C. under stirring with solution being obtained in about 2–3 minutes heating time. The solvent and water were evaporated to isolate the product mixed esters which were heated to a temperature of about 110° C. for about 4–5 minutes to expel all the solvent and water therefrom. The dried product mixed isomers had a hard waxy consistency. It is an isomeric mixture of $C_{18}$, $C_{20}$ and $C_{22}$ alkylamine salts of octadecenylsuccinic acid $C_{18}$, $C_{20}$ and $C_{22}$ alkyl monoamides in which the $C_{20}$ and $C_{22}$ alkyl groups are dominant.

WATER REPELLENT TEST

A portion of the hard waxy mixed isomers product prepared as in the above example was melted by warming to 130° F. and stirred with an approximately equal proportion by weight of refined paraffin wax (M.P. 124–127° F.) which had been melted by warming to about 130° F. Drops of the resulting composition in the molten condition were deposited onto a magnesium fluoride coated glass plate which was at about the same temperature as the molten composition. The applied composition was spread over the coated glass surface and then wiped with a paper towel until the bulk of the applied composition had been removed and approximately a monolayer remained.

The efficacy of the film of the composition as a water repellent on the magnesium fluoride coated glass plate was tested by applying a number of drops of water thereto and measuring the contact angle made by the water drops with the film of the composition using a goniometer. The contact angle for the water drops was found to be 106°. The glass plate was then subjected to a continuous washing with flowing water from the tap for about 2–3 minutes and the contact angle made by the water drops with the composition coated on the surface measured with the goniometer. The contact angle was again found to be 106°, indicating the composition coating to be highly water repellent and to be strongly bonded to the magnesium fluoride film on the glass plate.

Since the invention described herein may be variously practiced without departing from the spirit or scope thereof, it is intended that specific embodiments appearing in the above description shall be taken by way of illustration and not in limitation except as may be defined in the appended claims.

What is claimed and desired to be secured by Letters Patent of the United States is:

1. A composition comprising a hydrocarbon wax selected from the group consisting of paraffin and microcrystalline waxes mixed in a weight ratio of from about 1:1 to about 1:5, respectively with mixed isomers of an alkylamine salt of a substituted succinic acid alkylmonoamide of the formulas:

$$R_1R_2NH \cdot HOOC\underset{|}{C}H_2-\underset{|}{C}HR\,CONR_2R_1 \quad \text{and} \quad R_1RNOC\underset{|}{C}H_2-\underset{|}{C}HR\,COOH \cdot HNR_2R_1$$

wherein R is a member of the group consisting of alkyl and alkenyl radicals having a straight chain of from 12 to 22 carbon atoms, $R_1$ is a member of the group consisting of alkyl radicals having a straight chain of from 18 to 22 carbon atoms and $R_2$ is a member of the group consisting of hydrogen and alkyl radicals having a straight chain of from 18 to 22 carbon atoms.

2. A composition as defined in claim 1, wherein the mixed isomers are of the behenylamine salt of octadecenylsuccinic acid behenylmonoamide.

3. A composition as defined in claim 1, wherein the mixed isomers are of $C_{18}$, $C_{20}$ and $C_{22}$ alkylamine salts of octadecenylsuccinic acid $C_{18}$, $C_{20}$ and $C_{22}$ alkylmonoamides.

References Cited

UNITED STATES PATENTS

| | | | |
|---|---|---|---|
| 2,367,712 | 1/1945 | Bradley | 106—270 |
| 2,394,833 | 2/1946 | Young et al. | 106—270X |
| 3,214,460 | 10/1965 | McGee et al. | 106—10X |

DONALD J. ARNOLD, Primary Examiner

L. B. HAYES, Assistant Examiner

U.S. Cl. X.R.

106—13, 268, 270; 117—124, 168